Feb. 5, 1957  M. R. MAGLIO, JR  2,780,422
FLYING AIRCRAFT CARRIER
Filed July 5, 1955  2 Sheets-Sheet 1

INVENTOR.
MELVIN R. MAGLIO, JR.
BY
McMorrow, Berman + Davidson
ATTORNEYS

Feb. 5, 1957 M. R. MAGLIO, JR 2,780,422
FLYING AIRCRAFT CARRIER
Filed July 5, 1955
2 Sheets-Sheet 2
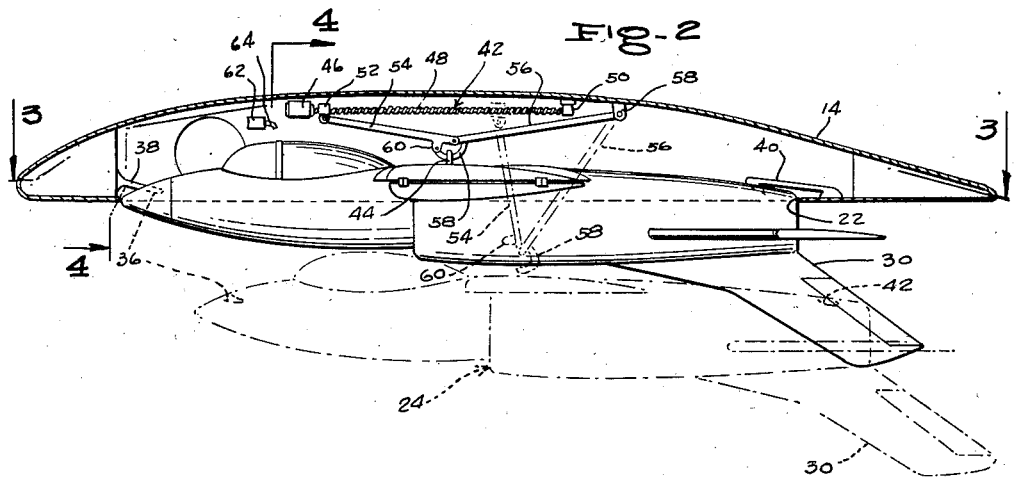
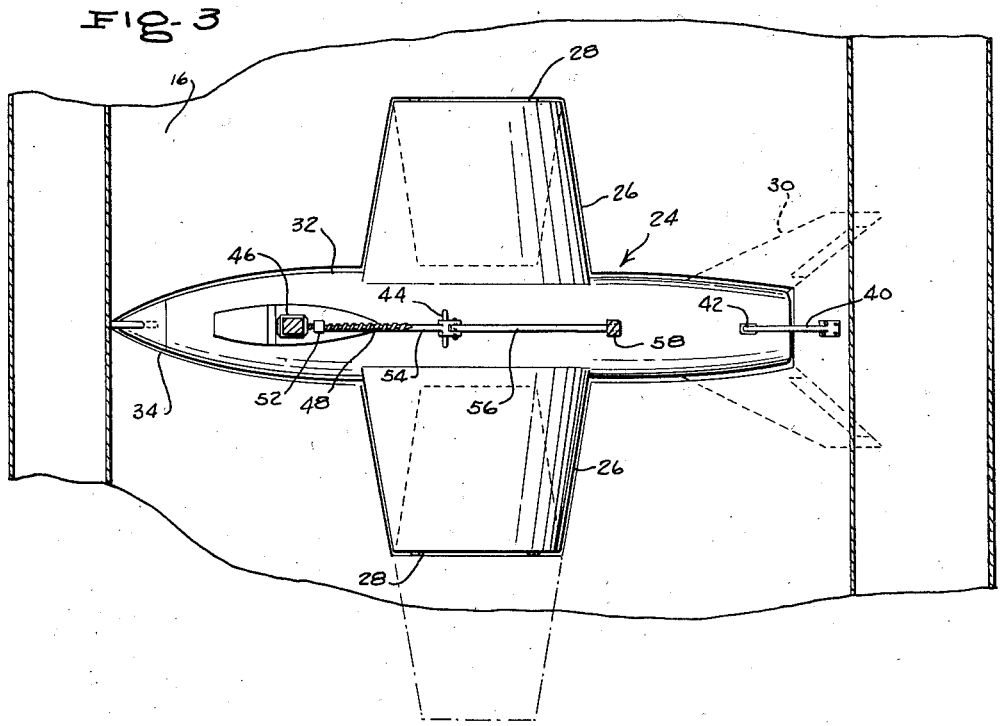
INVENTOR.
MELVIN R. MAGLIO, JR.
BY
McMorrow, Berman + Davidson
ATTORNEYS

United States Patent Office 2,780,422
Patented Feb. 5, 1957

2,780,422
FLYING AIRCRAFT CARRIER

Melvin R. Maglio, Jr., Suisun, Calif.

Application July 5, 1955, Serial No. 519,819

2 Claims. (Cl. 244—2)

This invention relates to an improved assembly of powered carrier airplane and smaller airplanes carried thereby.

It is well known that the load an airplane can carry is determined by the weight of the load with which it can take off rather than the weight of the load it can carry in flights, and a primary object of this invention is to provide, in a powered carrier airplane means for supporting smaller airplane thereon, such that the power plants of the smaller airplanes assist in the take-off of the carrier airplane and neutralize the weight of the smaller airplanes, and enable the carrier airplane to carry a greater load of fuel, ammunition, armament, and explosive devices to be dropped therefrom over a target area.

Yet another object of this invention is to have the smaller airplanes so mounted as to assist the carrier airplane in climbing for altitude.

Yet another object of this invention is to provide an assembly of the character described above in which the smaller airplanes can be launched from the carrier while aloft to protect it from attack, and in which the smaller airplanes can be retrieved by the carrier and employed to assist the carrier to fly in the event that one or more of the power plants of the carrier have been damaged.

Another and further object of this invention is to provide an assembly of the character indicated above, smaller airplanes so constructed as to take up a minimum amount of space in the wings of the carrier and offer a smaller amount of drag than would normally be involved in the carrying of smaller airplanes by a carrier.

A still further object of this invention is to provide means whereby the smaller airplanes can be refueled while carried by the carrier airplane.

Other objects and advantages will become apparent from a consideration of the following detailed description, forming the specification, and taken in conjunction with the accompanying drawings, in which:

Figure 2 is a transverse vertical cross sectional view, on an enlarged scale, taken through one of the carrier airplane wings, showing the disposition of a smaller airplane therein;

Figure 3 is a horizontal cross sectional view taken substantially along line 3—3 of Figure 2.

Figure 1:
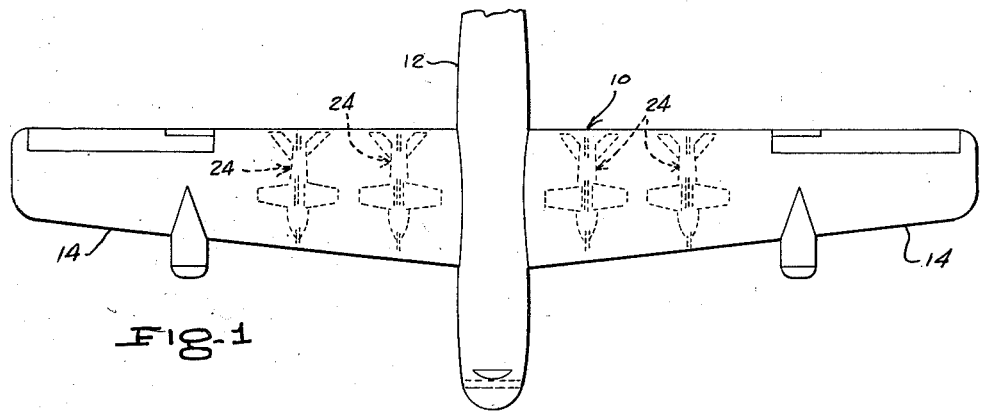
Figure 1 is a fragmentary top plan view of a carrier airplane with smaller airplanes carried in the wings thereof in accordance with this invention.
Figure 4:
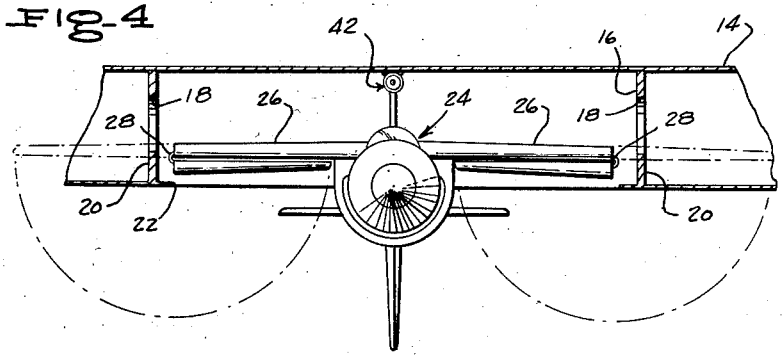
Figure 4 is a transverse vertical sectional view taken substantially along line 4—4 of Figure 2.

With continued reference to the drawings, the illustrated carrier airplane generally indicated at 10, comprises a fuselage 12 and wings 14 extending outwardly therefrom at opposite sides thereof intermediate its ends, in the usual manner and in accordance with conventional construction.

The wings 14 are hollow and are provided with spaced openings 22 in the lower walls 21 of the wings. Cross braces 20 at opposite sides of the openings 22 define with the upper walls 23 of the wings, chambers 16 for receiving smaller airplanes. Communication between adjacent chambers 16 is provided by openings in the braces 20.

Each of the smaller airplanes, generally designated 24, has preferably a jet type power plant, and is considerably smaller in size than the carrier 10, and has wing tips 26 hinged at 28 to the wing stubs 29 to fold onto the wing stubs so as to occupy a minimum amount of space with the associated chamber 16, and to enable the chambers 16 to be smaller than otherwise. Also, the vertical stabilizer 30 is disposed along the underside of the fuselage 32 of the smaller airplane 24.

The nose 34 of the fuselage 32 is provided with a rearwardly declining longitudinal socket 36 to receive therein a rearwardly projecting holding bar 38 carried by a forward longitudinal brace member 33 of the carrier wing at the forward end of the opening 22, to assist in maintaining the smaller airplane within the chamber 16. In addition, a forwardly projecting retaining hook 40 is provided on the lower wall 21 of the carrier wing adjacent the rear end of the opening 22, the hook 40 having a forward end adapted to engage in a hook-receiving opening 42 provided in the top of the rear end of the fuselage 32.

A launching mechanism, generally indicated at 42, is carried by the undersurface of the top wall 23 of the carrier wing and within each of the chambers 16 and releasably engages a ring 44 upstandingly secured on the upper surface of the smaller airplane fuselage 32 intermediate the ends thereof.

The launching mechanism 42 comprises a reversible motor 46 mounted on the undersurface of the top wall 23 of the carrier wing 14 and connected to the forward end of a longitudinal jack screw 48 extending rearwardly across the wing 14 and journalled at its rear end in a bearing 50 dependingly carried by the upper wall 23 of the wing. A follower block 52 is threadingly carried upon the jack screw 48 for movement longitudinally thereof, upon rotation of the jack screw by action of the motor 46. A hanger arm 54 has its forward end pivoted to the follower block 52, and is pivotally connected at its rear end to the forward end of another hanger arm 56. The rear end of the hanger arm 56 is pivotally mounted in a bracket 58 dependingly carried by the upper wall 23 of the wing 14 behind the bearing 50, as clearly shown in Figure 2.

An arcuate catch 58 is dependingly pivoted at 60 at its forward end on the rear end of the hanger arm 54 and is adapted to engage rearwardly through the ring 44.

Thus, with a smaller airplane 24 secured in a chamber 16, the lower part thereof, including its power plant, is exposed below the carrier wing 14 and can be operated to assist take-off and climbing of the carrier airplane.

In flight, when it is desired to launch a smaller airplane 24 from the carrier 10, the pilot of the smaller airplane 24 passes through the opening 18 in the wing braces 20 to his airplane and starts the motor so as to move the follower block 52 rearwardly along the jack screw 48 and cause the hanger arms 54 and 56 to move downwardly from the solid line position shown in Figure 2 to the broken line position shown therein so that disengagement of the retaining bar 38 and retaining hook 40 from the fuselage of the smaller airplane takes place and the airplane 24 is lowered through the opening 22 in the lower wall 21 of the wing of the carrier. The folded wing tips 28 are then unfolded to their operative positions, and the airplane 24 flown in forward direction so as to disengage the catch 58 and go into independent flight.

Recovery of a smaller airplane 24 is accomplished by flying the airplane 24 so that the ring 44 engages the catch 58, whereupon the motor 46 is run in a direction to lift the airplane 24 with the wing tips 28 folded, into the recess 16 and into engagement with the retaining bar 38 and the retaining hook 40.

A refueling boom 62 is provided in each of the chambers 16 and has a flexible hose 64 extending therefrom for refueling a smaller airplane 24 during flight of the carrier airplane.

While there is shown and described the preferred embodiment of the invention, it is to be understood that the structure is susceptible to change and modification within the practicability of the invention and therefore should be limited only by the scope of the claims appended hereto.

What is claimed is:

1. In an assembly of the character described, a carrier airplane having a hollow wing having upper and lower walls, said lower wall being provided with an opening having front and rear ends and sides, wing braces between said upper and lower walls and extending across the wing on opposite sides of said opening, the wing braces and the upper wing wall defining a chamber, a smaller airplane having a fuselage having front and rear ends and folding wings on opposite sides thereof, normally wider than said opening and narrower than said opening when folded, said smaller airplane fuselage having an upper portion together with the folded wings, positioned within said chamber with the front and rear ends of its fuselage adjacent to the front and rear ends of said opening, said smaller airplane fuselage having a lower portion including a jet propulsion power plant positioned below the lower wing wall of the carrier airplane, and a downwardly extensible launching mechanism mounted on the carrier airplane wing within said chamber and releasably engaged with the smaller airplane fuselage, a fixed rearwardly projecting retaining bar on the lower wing wall of the carrier airplane at the front end of said opening, a forwardly projecting fixed hook on said lower wing wall at the rear end of said opening, the front end of the fuselage of the smaller airplane having therein a socket releasably receiving said retaining bar and means on the rear end of the fuselage of the smaller airplane releasably engaging said hook.

2. In an assembly of the character described, a carrier airplane having a hollow wing having upper and lower walls, said lower wall being provided with an opening having front and rear ends and sides, wing braces between said upper and lower walls and extending across the wing on opposite sides of said opening, the wing braces and the upper wing wall defining a chamber, a smaller airplane having a fuselage having front and rear ends and folding wings on opposite sides thereof, normally wider than said opening and narrower than said opening when folded, said smaller airplane fuselage having an upper portion together with the folded wings, positioned within said chamber with the front and rear ends of its fuselage adjacent to the front and rear ends of said opening, said smaller airplane fuselage having a lower portion including a jet propulsion power plant positioned below the lower wing wall of the carrier airplane, and a downwardly extensible launching mechanism mounted on the carrier airplane wing within said chamber and releasably engaged with the smaller airplane fuselage, said smaller airplane fuselage having a loop intermediate its ends, said launching gear comprising a horizontal jack screw mounted on the upper wing wall of the carrier airplane and extending longitudinally of the fuselage thereof, a follower block threaded on said jack screw, a forward lift arm having a front end pivoted to said follower block and a rear end, a rear lift arm having a rear end pivoted to said upper wing wall and a front end, the rear end of the forward lift arm being pivoted to the front end of the rear lift arm, a hook element having a front end pivoted to and depending from said forward lift arm near the rear end of the forward lift arm, said hook element having a free rear end releasably engaged through the loop of the smaller airplane, and means for rotating said jack screw in opposite direction to raise and lower said lift arm.

References Cited in the file of this patent

UNITED STATES PATENTS

| | | |
|---|---|---|
| 1,731,757 | Tubbe | Oct. 14, 1929 |
| 2,185,235 | Swanson | Jan. 2, 1940 |
| 2,399,217 | Fahrney | Apr. 30, 1946 |
| 2,680,346 | Michael | June 8, 1954 |

FOREIGN PATENTS

| | | |
|---|---|---|
| 317,774 | Great Britain | Aug. 21, 1929 |
| 1,006,380 | France | Jan. 23, 1952 |